(12) United States Patent
Park et al.

(10) Patent No.: US 8,485,533 B2
(45) Date of Patent: Jul. 16, 2013

(54) DYNAMIC SEAL USING VULCANIZATION OF FLUOROCARBON ELASTOMERS

(75) Inventors: Edward H. Park, Saline, MI (US);
Alexander Berdichevsky, Farmington Hills, MI (US); Vahidin Alajbegovic, Novi, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 1367 days.

(21) Appl. No.: 11/637,977

(22) Filed: Dec. 13, 2006

(65) Prior Publication Data
US 2007/0210530 A1    Sep. 13, 2007

Related U.S. Application Data

(62) Division of application No. 10/771,692, filed on Feb. 4, 2004, now abandoned.

(51) Int. Cl.
*F16J 15/32* (2006.01)

(52) U.S. Cl.
USPC .................................................. 277/551

(58) Field of Classification Search
USPC ................................................. 277/551, 559
See application file for complete search history.

(56) References Cited

U.S. PATENT DOCUMENTS

| | | |
|---|---|---|
| 2,476,884 A | 7/1949 | Maynard |
| 2,710,290 A | 6/1955 | Safford et al. |
| 2,927,908 A | 3/1960 | Konkle et al. |
| 3,037,954 A | 6/1962 | Gessler et al. |
| 3,538,028 A | 11/1970 | Morgan |
| 3,580,889 A | 5/1971 | Barney |
| 3,787,341 A | 1/1974 | Aron |
| 3,853,811 A | 12/1974 | Chandrasekaran |
| 3,884,877 A | 5/1975 | Kolb |

(Continued)

FOREIGN PATENT DOCUMENTS

| | | |
|---|---|---|
| CA | 2475263 | 9/2003 |
| CA | 2513789 | 8/2004 |

(Continued)

OTHER PUBLICATIONS

"Fluorine-Containing Polymers" Encyclopedia of Polymer Science & Engineering, vol. 7, Second Edition (1987). (pp. 256-267).

(Continued)

*Primary Examiner* — Vishal Patel
(74) *Attorney, Agent, or Firm* — Daniel J. Sepanik, Esq.; Harness, Dickey & Pierce, P.L.C.

(57) ABSTRACT

A dynamic seal assembly for installation between first and second relatively rotating members, comprising a ring for fixed engagement with said first member and an annular seal extending radially from said ring and configured to slidably engage said second member, wherein said radial seal has a thickness, and a length that is from about 1 to about 15 times greater than said thickness. In various embodiments, the seal is formed of a rubber composition comprising a vulcanized fluorocarbon elastomer dispersed in a matrix of a thermoplastic polymeric material. In various embodiments, the matrix forms a continuous phase and the vulcanized elastomeric material is in the form of particles forming a non-continuous phase. The compositions may be made by combining a curative, an uncured fluorocarbon elastomer, and a thermoplastic material, and heating the mixture to effect vulcanization of the elastomeric material, while applying mechanical energy.

6 Claims, 10 Drawing Sheets

U.S. PATENT DOCUMENTS

| | | |
|---|---|---|
| 4,035,565 A | 7/1977 | Apotheker et al. |
| 4,094,949 A * | 6/1978 | Yokokawa et al. ............ 264/234 |
| 4,202,555 A | 5/1980 | Becker et al. |
| 4,287,320 A | 9/1981 | Kolb |
| 4,311,628 A | 1/1982 | Abdou-Sabet et al. |
| 4,328,140 A | 5/1982 | Singletary et al. |
| 4,386,170 A | 5/1983 | Monroe |
| 4,419,499 A | 12/1983 | Coran et al. |
| 4,450,263 A | 5/1984 | West |
| 4,451,542 A | 5/1984 | Ishida et al. |
| 4,491,536 A | 1/1985 | Tomoda |
| 4,530,881 A | 7/1985 | Santoso et al. |
| 4,553,761 A | 11/1985 | Blesing et al. |
| 4,572,516 A | 2/1986 | Symons et al. |
| 4,596,855 A | 6/1986 | Stewart |
| 4,624,978 A | 11/1986 | Frayer |
| 4,656,228 A | 4/1987 | Richter et al. |
| 4,696,976 A | 9/1987 | Ellerbe, III et al. |
| 4,696,989 A | 9/1987 | Oka et al. |
| 4,696,998 A | 9/1987 | Brunelle |
| 4,713,418 A | 12/1987 | Logothetis et al. |
| 4,748,204 A * | 5/1988 | Kawashima et al. ............ 525/72 |
| 4,787,991 A | 11/1988 | Morozumi et al. |
| 4,812,357 A | 3/1989 | O'Rell et al. |
| 4,822,061 A * | 4/1989 | Kammeraad ................ 277/502 |
| 4,844,485 A * | 7/1989 | Antonini et al. .............. 277/553 |
| 5,006,594 A * | 4/1991 | Rees ............................ 524/520 |
| 5,018,749 A | 5/1991 | Forch |
| 5,095,072 A | 3/1992 | Kobayashi et al. |
| 5,108,780 A | 4/1992 | Pitt et al. |
| 5,206,293 A * | 4/1993 | Sakai et al. ................... 525/194 |
| 5,209,499 A * | 5/1993 | Ruff et al. .................... 277/551 |
| 5,217,137 A | 6/1993 | Andrews |
| 5,219,931 A | 6/1993 | Siol et al. |
| 5,326,111 A * | 7/1994 | Hatch .......................... 277/565 |
| 5,331,040 A | 7/1994 | Lee |
| 5,354,811 A | 10/1994 | Kamiya et al. |
| 5,370,404 A | 12/1994 | Klein et al. |
| 5,371,143 A * | 12/1994 | Novak et al. .................... 525/88 |
| 5,384,374 A | 1/1995 | Guerra et al. |
| 5,391,610 A | 2/1995 | Comert et al. |
| 5,397,832 A | 3/1995 | Ellul |
| 5,427,387 A | 6/1995 | Johnston |
| 5,457,158 A * | 10/1995 | Caporiccio et al. ............ 525/102 |
| 5,459,202 A * | 10/1995 | Martinez et al. ............... 525/200 |
| 5,548,028 A * | 8/1996 | Tabb ............................ 525/194 |
| 5,585,152 A * | 12/1996 | Tamura et al. ................ 428/35.1 |
| 5,589,526 A | 12/1996 | Sienel et al. |
| 5,639,810 A | 6/1997 | Smith, III |
| 5,700,866 A | 12/1997 | Tabb |
| 5,713,577 A | 2/1998 | Lannert et al. |
| 5,723,544 A | 3/1998 | Lee |
| 5,747,588 A | 5/1998 | Mann |
| 5,758,881 A | 6/1998 | Stanley |
| 5,792,348 A | 8/1998 | Eisinga |
| 5,910,544 A | 6/1999 | Ozawa et al. |
| 5,962,589 A | 10/1999 | Matsumoto et al. |
| 6,048,939 A | 4/2000 | Priester |
| 6,054,537 A | 4/2000 | Shimizu et al. |
| 6,066,697 A | 5/2000 | Coran et al. |
| 6,079,465 A | 6/2000 | Takeyama et al. |
| 6,114,441 A | 9/2000 | Spohn et al. |
| 6,147,158 A | 11/2000 | Chmielewski |
| 6,162,385 A | 12/2000 | Grosse-Puppendahl et al. |
| 6,303,870 B1 * | 10/2001 | Nazaryan et al. ............. 174/172 |
| 6,310,141 B1 | 10/2001 | Chen et al. |
| 6,312,639 B1 | 11/2001 | Ertle et al. |
| 6,407,174 B1 | 6/2002 | Ouhadi |
| 6,409,177 B1 | 6/2002 | Johnston |
| 6,410,630 B1 | 6/2002 | Hoover et al. |
| 6,429,249 B1 | 8/2002 | Chen et al. |
| 6,437,030 B1 | 8/2002 | Coran et al. |
| 6,485,256 B1 * | 11/2002 | Iketani .......................... 415/113 |
| 6,500,374 B1 | 12/2002 | Akioka et al. |
| 6,520,507 B2 * | 2/2003 | Pataille et al. ................. 277/561 |
| 6,531,568 B1 * | 3/2003 | Shibuya et al. ............... 528/170 |
| 6,624,251 B1 | 9/2003 | Chmielewski |
| 6,630,231 B2 * | 10/2003 | Perez et al. ................. 428/297.4 |
| 6,649,217 B1 | 11/2003 | Gust |
| 6,649,704 B2 | 11/2003 | Brewer et al. |
| 6,656,831 B1 | 12/2003 | Lee et al. |
| 6,663,966 B2 | 12/2003 | Mhetar |
| 6,729,624 B1 | 5/2004 | Johnston |
| 6,737,479 B2 | 5/2004 | Faulkner |
| 6,743,876 B2 * | 6/2004 | Wille et al. .................... 526/255 |
| 6,774,171 B2 | 8/2004 | Kassa et al. |
| 6,787,221 B2 | 9/2004 | Botrie et al. |
| 6,806,306 B2 | 10/2004 | Chmielewski et al. |
| 6,860,486 B2 | 3/2005 | Hacker et al. |
| 6,872,325 B2 | 3/2005 | Bandyopadhyay et al. |
| 6,939,477 B2 | 9/2005 | Stark et al. |
| 6,945,537 B2 * | 9/2005 | Guillerme et al. ............ 277/559 |
| 7,022,769 B2 * | 4/2006 | Park ............................. 525/191 |
| 7,029,750 B2 | 4/2006 | Takei |
| 7,087,679 B2 | 8/2006 | Shimizu et al. |
| 7,098,270 B2 | 8/2006 | Hochgesang et al. |
| 7,135,527 B2 | 11/2006 | Park |
| 7,151,134 B2 | 12/2006 | Park et al. |
| 7,153,908 B2 | 12/2006 | Park |
| 7,351,769 B2 | 4/2008 | Park |
| 7,413,697 B2 | 8/2008 | Park et al. |
| 2002/0158421 A1 * | 10/2002 | Johnston ...................... 277/549 |
| 2002/0198320 A1 * | 12/2002 | Chmielewski et al. ........ 525/100 |
| 2003/0026995 A1 | 2/2003 | Duchesne et al. |
| 2003/0138655 A1 | 7/2003 | Watanabe et al. |
| 2003/0166780 A1 | 9/2003 | Shimizu et al. |
| 2004/0183702 A1 | 9/2004 | Nachtigal et al. |
| 2004/0260023 A1 * | 12/2004 | Park et al. ..................... 525/131 |
| 2005/0014900 A1 * | 1/2005 | Park ............................. 525/191 |
| 2005/0148183 A1 | 7/2005 | Shiro et al. |
| 2005/0155690 A1 * | 7/2005 | Park ............................... 156/60 |
| 2005/0165168 A1 * | 7/2005 | Park ............................. 525/165 |
| 2005/0167928 A1 | 8/2005 | Park et al. |
| 2005/0171282 A1 | 8/2005 | Park |
| 2005/0222337 A1 * | 10/2005 | Park ............................. 525/199 |
| 2005/0272872 A1 * | 12/2005 | Park ............................. 525/192 |
| 2005/0275565 A1 | 12/2005 | Nachtigal et al. |
| 2005/0281973 A1 | 12/2005 | Park |
| 2005/0288434 A1 | 12/2005 | Sugiura et al. |
| 2006/0003127 A1 | 1/2006 | Park et al. |
| 2006/0004126 A1 | 1/2006 | Park et al. |
| 2006/0004142 A1 | 1/2006 | Park et al. |
| 2006/0124889 A1 | 6/2006 | Park et al. |
| 2006/0142467 A1 | 6/2006 | Park |
| 2006/0142491 A1 * | 6/2006 | Park ............................. 525/192 |
| 2006/0142492 A1 | 6/2006 | Park |
| 2006/0148954 A1 | 7/2006 | Park et al. |
| 2006/0290070 A1 | 12/2006 | Park |
| 2007/0004862 A1 | 1/2007 | Park |
| 2007/0004865 A1 | 1/2007 | Park |
| 2007/0044906 A1 | 3/2007 | Park |
| 2007/0055020 A1 | 3/2007 | Park |
| 2007/0060707 A1 | 3/2007 | Park |
| 2007/0142555 A1 | 6/2007 | Park |
| 2007/0167574 A1 | 7/2007 | Park |
| 2008/0149881 A1 | 6/2008 | Park |
| 2008/0157439 A1 | 7/2008 | Park |

FOREIGN PATENT DOCUMENTS

| | | |
|---|---|---|
| EP | 0132583 | 2/1985 |
| EP | 0148719 | 7/1985 |
| EP | 0239707 | 10/1987 |
| EP | 0168020 | 10/1989 |
| EP | 0356619 | 3/1990 |
| EP | 0422960 | 4/1991 |
| EP | 0431325 | 6/1991 |
| EP | 0432911 | 6/1991 |
| EP | 0254307 | 12/1991 |
| EP | 0304843 | 3/1993 |
| EP | 0566313 | 10/1993 |
| EP | 0439734 | 12/1994 |
| EP | 0681113 | 11/1995 |
| EP | 0714944 | 6/1996 |
| EP | 1046841 | 10/2000 |
| EP | 1209203 | 5/2002 |
| EP | 1555110 | 7/2005 |
| EP | 1591469 | 11/2005 |

| | | |
|---|---|---|
| GB | 1357904 | 6/1974 |
| JP | 58-032655 | 2/1983 |
| JP | 62-011767 | 1/1987 |
| JP | 62-236841 | 10/1987 |
| JP | 05-156090 | 6/1993 |
| JP | 05-186606 | 7/1993 |
| JP | 06-016949 | 1/1994 |
| JP | 11-140269 | 5/1999 |
| JP | 2000-079928 | 3/2000 |
| JP | 2001-336679 | 12/2001 |
| WO | WO 9600761 | 1/1996 |
| WO | WO 00/11073 | 3/2000 |
| WO | WO 01/48077 | 7/2001 |
| WO | WO 01/98405 | 12/2001 |
| WO | WO 01/98405 A2 * | 12/2001 |
| WO | WO 02/070929 | 9/2002 |

OTHER PUBLICATIONS

"Polyurethanes" Encyclopedia of Polymer Science & Engineering, vol. 13, Second Edition (Date Unknown). (pp. 274-278).

Webpage: "Dyneon™ Fluorothermoplastics" Accessed from 3M Manufacturing and Industrial and Downloaded May 8, 2003. (2 pages).

"Viton® Fluoroelastomer, A Product of DuPont Dow Elastomers", Technical Information, DuPont Dow Elastomers, Copyright 1988.

"AFLAS™ The Fluoroelastomer," Asahi Glass Company, Product Information, Apr. 11, 2003. (8 pages).

Webpage: Tetrafluoroethylene-Propylene Rubber, Date Unknown. (3 pages).

Schmiegel, Walter W., "A Review of Recent Progress in the Design and Reactions of Base-Resistant Fluoroelastomers", DuPont Dow Elastomers, IRC, Jul. 2003.

Moore, Michael J. "Silanes as Rubber-to-Metal Bonding Agents," 160th Meeting of the Rubber Division, American Chemical Society, Cleveland, Ohio, Paper No. 105, (2001). (17 pages).

Viton® Fluoroelastomer: Viton Extreme ETP-600S Technical Information (Formerly designated VTR-8710), DuPont Dow Elastomers (Date Unknown). (6 pages).

Material Safety Data Sheet "DuPont™ TPV 60A01 and 80A01", C.S. Wong, (Sep. 18, 2001). (9 pages).

DuPont "Grades for Customer Evaluation"—TPV 60A and TPV 80A. (3 pages).

Kim, K. et al. "Mold Release Additive Effects on Chlorine and Fluorine Rubber Compound" Struktol Company of America Paper No. 7, Presented at IRMC 2004 Meeting. Apr. 27-28, 2004. (18 pages).

Solvay Solexis: "Product Data Sheet: Tecnoflon FPA 1" available at www.solvaysolexis.com. Copyright 2003. (2 pages).

Sasol: Sasol Olefins and Surfactants available at www.sasoltechdata.com. (20 pages).

* cited by examiner

DYNAMIC SEAL USING VULCANIZATION OF FLUOROCARBON ELASTOMERS

CROSS REFERENCE TO RELATED APPLICATIONS

This application is a divisional of U.S. patent application Ser. No. 10/771,692 filed on Feb. 4, 2004 now abandoned, the disclosure of which is incorporated herein by reference.

INTRODUCTION

This invention relates to seals, and more particularly relates to annular seals of the type to be mounted on a rotating shaft, such as, a wheel oil seal installed between a rotating shaft and outer surrounding stationary housing of a motor vehicle.

Dynamic gaskets are typically formed of cured elastomeric materials having a desirable set of physical properties typical of the elastomeric state. These gaskets typically show a high tendency to return to their original size and shape following removal of a deforming force, and they retain physical properties after repeated cycles of stretching, including strain levels up to 1000%. Based on these properties, cured elastomeric materials are generally useful for making dynamic articles such as seals and gaskets.

Because they are formed of thermoset materials, gaskets formed of cured elastomeric materials can not generally be processed by conventional thermoplastic techniques such as injection molding, extrusion, or blow molding. Rather, articles must be fashioned from elastomeric materials by high temperature curing and compression molding. Although these and other rubber compounding operations are conventional and known, they nevertheless tend to be more expensive and require higher capital investment than the relatively simpler thermoplastic processing techniques. Another drawback is that scrap generated in the manufacturing process is difficult to recycle and reuse, which further adds to the cost of manufacturing such articles.

In today's automobile engines, the high temperatures of use have led to the development of a new generation of lubricants containing a high level of basic materials such as amines. Seals are often in contact with such fluids during use, and are subject to a wide variety of challenging environmental conditions, including exposure to high temperature, contact with corrosive chemicals, and high wear conditions during normal use. Accordingly, it is desirable to make seals from materials that combine elastomeric properties and stability or resistance to the environmental conditions.

To meet the demands of the new lubricant technology, seals using fluorocarbon elastomers have been developed that are highly resistant to the basic compounds found in the lubricating oils and greases. Specifically, seals formed of cured elastomers based on copolymers of tetrafluoroethylene and propylene have met great commercial success. As a thermoset material, the cured fluorocarbon rubber is subject to the processing disadvantages noted above.

It would be desirable to provide an elastomeric or rubber composition seal that would combine a high level of chemical resistance with the advantages of thermoplastic processability. It would further be desirable to provide methods for formulating chemically resistant rubbers having such advantageous properties.

SUMMARY

The present invention provides dynamic seal assemblies for installation between first and second relatively rotating members, comprising: a ring for fixed engagement with said first member and an annular seal extending radially from said ring and configured to slidably engage said second member, wherein said radial seal has a thickness and a length that is from about 1 to about 15 times greater than said thickness. In various embodiments, the assembly comprises a dynamic seal for installation between an inner rotating shaft and outer non-rotating housing. The seal has a first ring for fixed engagement with the housing, including an annular radial seal extending from the first ring into sliding contact with the shaft. The annular radial seal, which is configured to slidably engage the rotating shaft has a thickness, and a length being from about 1 to about 15 times greater than the thickness.

In one embodiment of the invention, the seal is made of a processable rubber composition containing a vulcanized elastomeric material dispersed in a matrix of a thermoplastic polymeric material. The elastomeric material comprises a synthetic, non-crystalline fluorine-containing polymeric material that exhibits elastomeric properties when crosslinked or vulcanized. In a preferred embodiment, the material contains repeating units derived from tetrafluoroethylene, at least one $C_{2-4}$ olefin, and optionally one or more additional fluorine-containing monomers. In another, the material contains repeating units derived from vinylidene fluoride, hexafluoropropylene, and optional other fluorine-containing monomers. In one embodiment the matrix forms a continuous phase and the vulcanized elastomeric material is in the form of particles forming a non-continuous phase.

A method for making a dynamic seal rubber composition comprises combining a curative, an elastomeric material as described above, and a thermoplastic material, and heating the mixture at a temperature and for a time sufficient to effect vulcanization of the elastomeric material, while mechanical energy is applied to mix the mixture during the heating step. The thermoplastic material comprises a polymeric material that softens and flows upon heating. The dynamic seals may be readily formed from the rubber compositions according to conventional thermoplastic processes such as blow molding, injection molding, and extrusion.

Further areas of applicability of the present invention will become apparent from the detailed description provided hereinafter. It should be understood that the detailed description and specific examples, while indicating embodiments of the invention, are intended for purposes of illustration only and are not intended to limit the scope of the invention.

It should be noted that the figures set forth herein are intended to exemplify the general characteristics of the apparatus, materials and methods among those of this invention, for the purpose of the description of such embodiments herein. These figures may not precisely reflect the characteristics of any given embodiment, and are not necessarily intended to define or limit specific embodiments within the scope of this invention.

DESCRIPTION

The following definitions and non-limiting guidelines must be considered in reviewing the description of this invention set forth herein.

The headings (such as "Introduction" and "Summary,") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. Any discussion of the content of references cited in the Introduction is intended merely to provide a general summary of assertions made by the authors of the references, and does not constitute an admission as to the accuracy of the content of such references. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

Figure 1A:
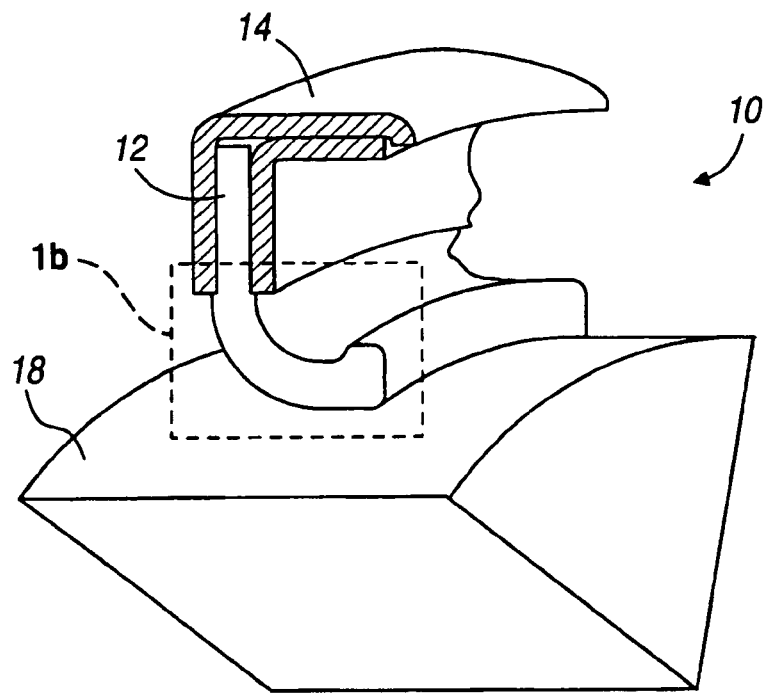
FIGS. 1a and 1b are perspective views of a dynamic seal in accordance with the teachings of the present invention.
Figure 1B:
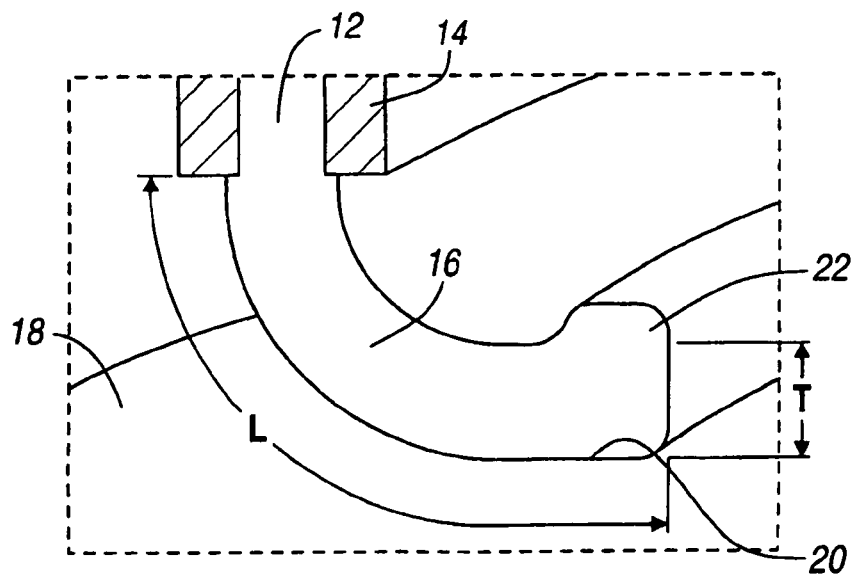

FIGS. 1a and 1b are perspective views of one embodiment of a dynamic seal 10 in accordance with the teachings of the present invention. The dynamic seal 10 has a first ring 12 for fixed engagement with the housing 14 which is coupled to an annular radial seal 16 extending from the first ring 12 into sliding contact with the shaft 18. The annular radial seal 16, which is configured to slidably engage the rotating shaft 18, has a thickness T and a length L that is from about 1 to about 15 times greater than the thickness. Optionally, L is from about 3 to about 15 times greater than T, optionally from about 5 to about 12 times greater than T, optionally from about 5 to about 10 times greater than T.

In various embodiments, the dynamic seal 10 is formed of a processable rubber composition comprising a vulcanized elastomeric material dispersed in a matrix. The vulcanized elastomeric material is the product of vulcanizing, crosslinking, or curing a fluorocarbon elastomer. The matrix is made of a thermoplastic material containing at least one thermoplastic polymer. The processable rubber compositions may be processed by conventional thermoplastic techniques to form dynamic seals having physical properties that make them useful in a number of applications calling for elastomeric properties.

As seen in FIG. 1b, the dynamic seal 10 can have a flat bearing surface 20 which interfaces with the rotating shaft 18. Additionally shown is an optional reinforcement bead 22 which increases the bearing force of the seal against the rotating shaft 18. The length of the bearing surface 20 is between 1 and 99%, and preferably 25-75% of the length.

Figure 2A:
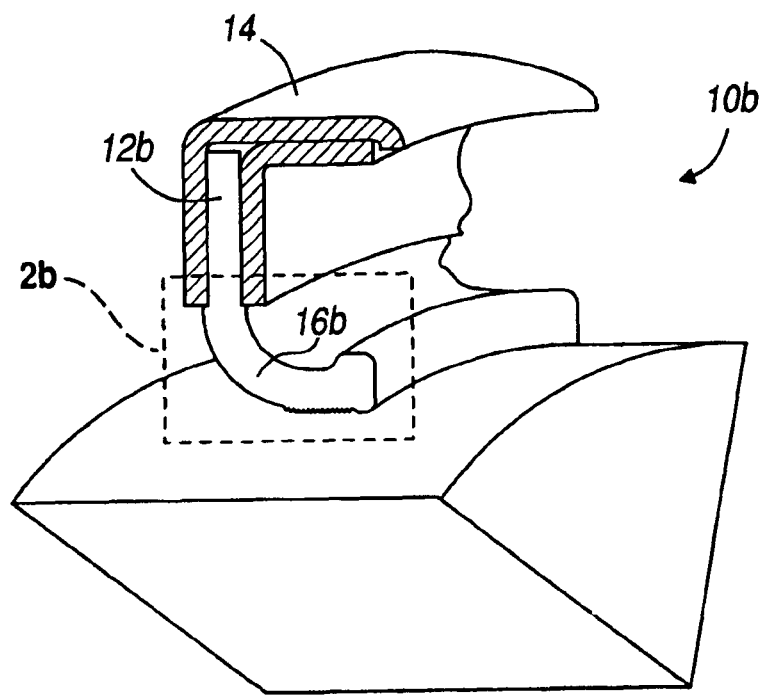
FIGS. 2a and 2b are perspective views of a dynamic seal in accordance with a second embodiment of the present invention.
Figure 2B:
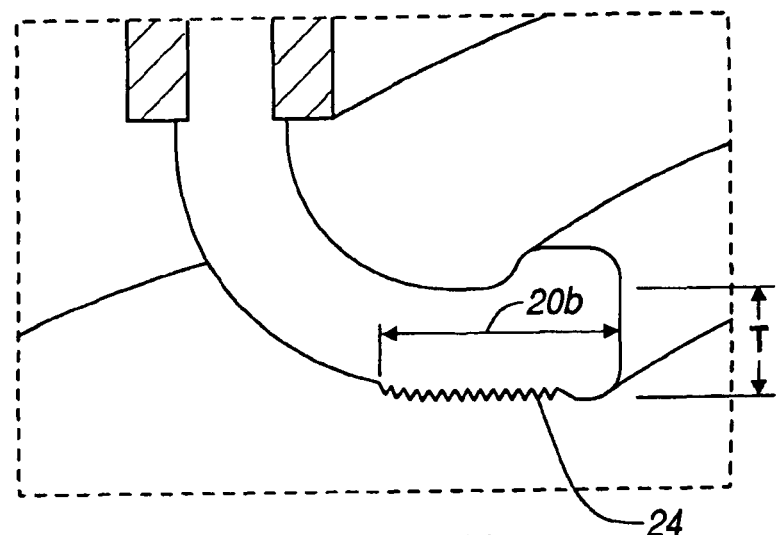

As can be seen in FIG. 2b, the dynamic seal 10b can have a bearing surface 20b which is substantially variegated. In this regard, a spiral groove 24 is formed onto a portion of the flat bearing surface 20b. It is envisioned that there can be between 5 and 200 grooves per inch, and these grooves would cover between 10 and 90%, and preferably 25-75% of the flat bearing surface. The number of spiral grooves which contact with the shaft surface is between 1 and 10, and preferably between 1 and 3 grooves in contact with the shaft.

Figure 3A:
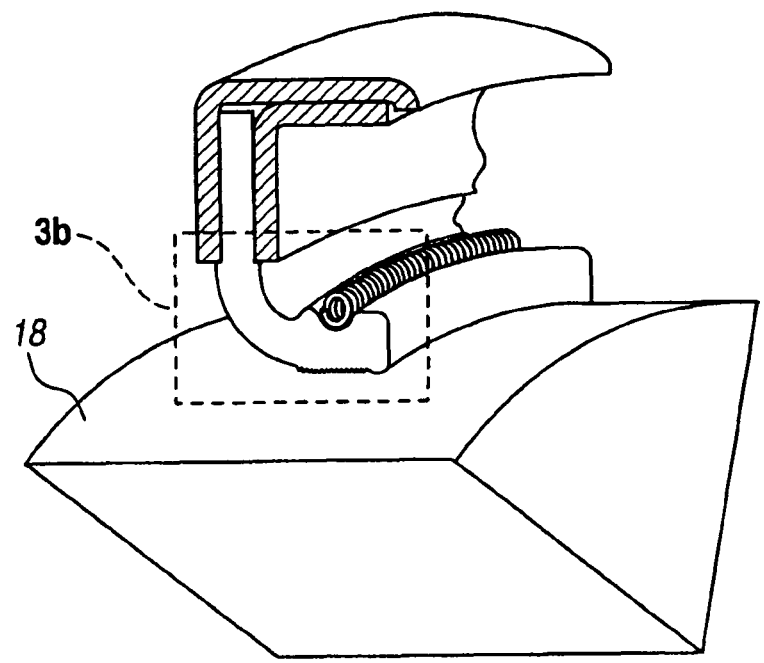
FIGS. 3a and 3b are perspective views of a dynamic seal in accordance with third embodiment of the present invention.
Figure 3B:
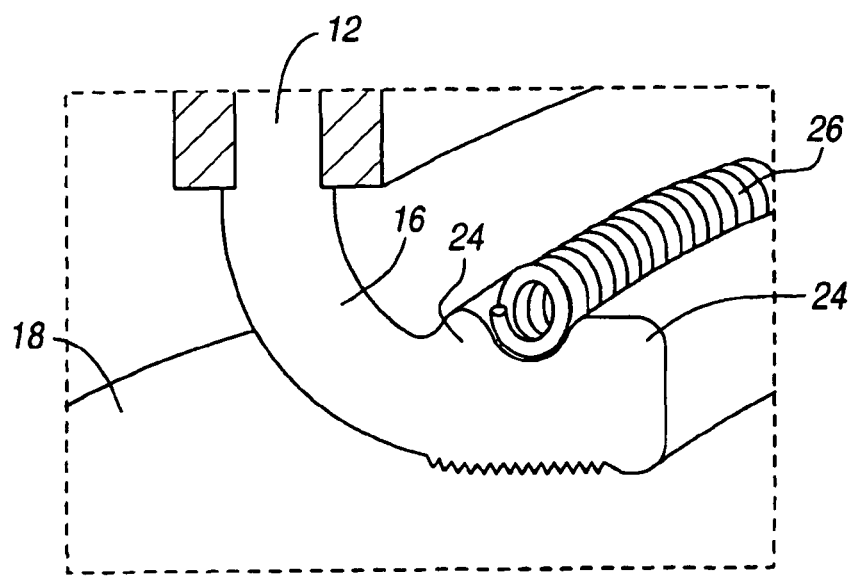
Figure 4A:
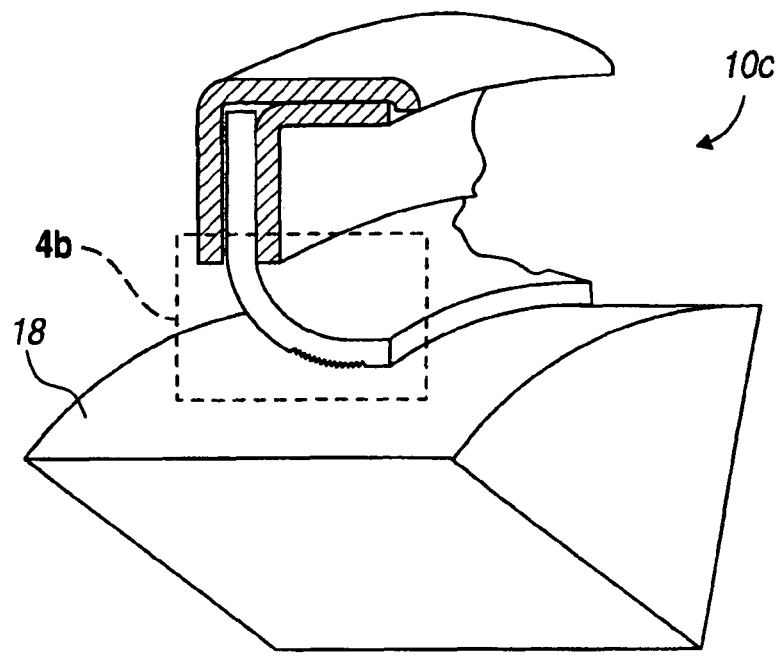
FIGS. 4a and 4b are perspective views of a dynamic seal in accordance with a fourth embodiment of the present invention.
Figure 4B:
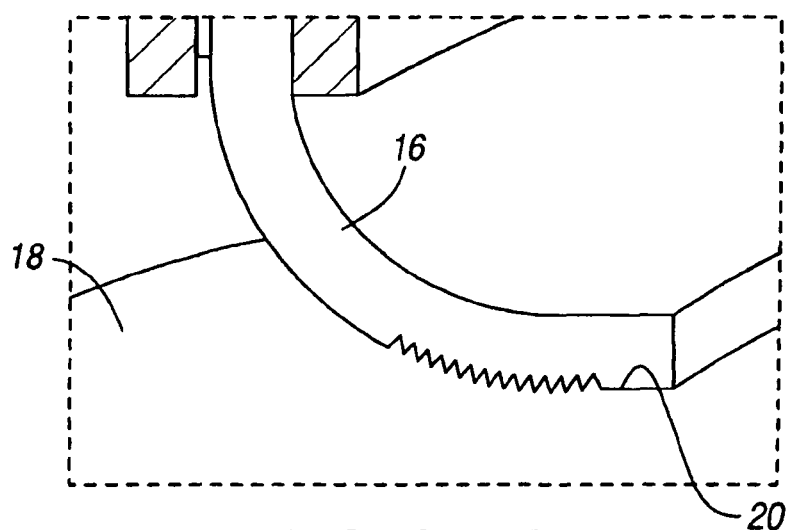
Figure 5A:
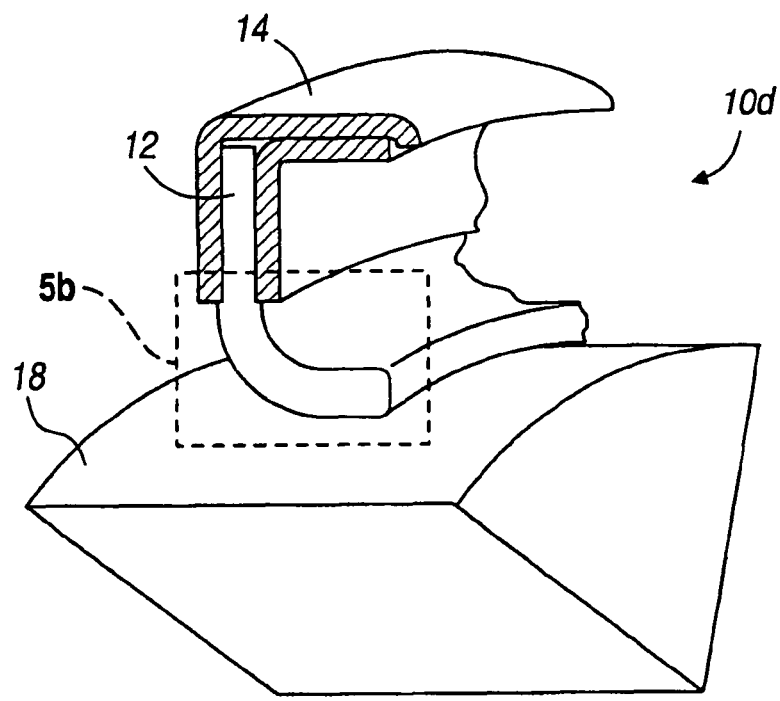
FIGS. 5a and 5b are perspective views of a dynamic seal in accordance with a fifth embodiment of the present invention.
Figure 5B:
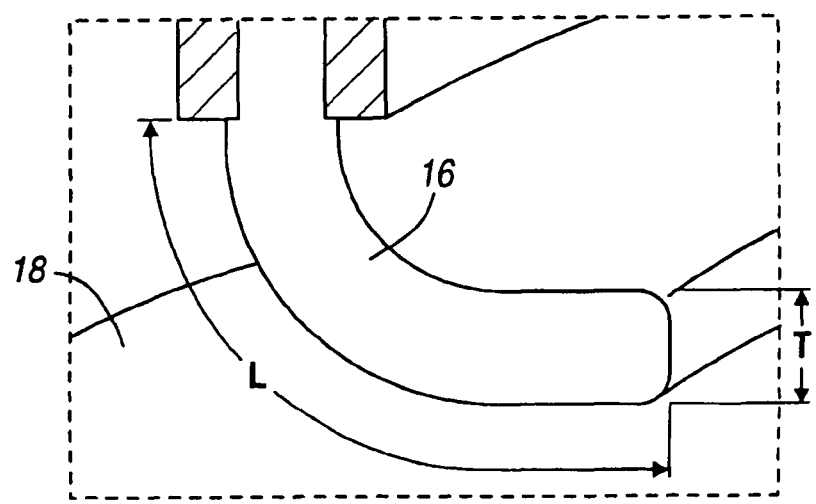

FIGS. 3a and 3b represent another embodiment of the dynamic seal. Shown is a flange portion having a pair of suspension flanges 24. Disposed between the suspension flanges 24 is a spring reinforcement member 26. The spring reinforcement member 26 functions to increase the coupling force between the bearing surface 20b and the rotating shaft 18.

FIGS. 4a-5b represent alternate dynamic seal 10c and 10d. As can be seen, the seals can have varying length to width ratios. Specifically, the length per width ratio of the seal is greater than 1 to about 15, and preferably about 5 to 12, and most preferably 8 to 10. Additionally, the dynamic seals need not have a reinforcing rib or variegated bearing surface.

In particular preferred embodiments, a dynamic seal 10 is made from the processable compositions, which typically exhibit a Shore A hardness of 50 or more, preferably Shore A 70 or more, and typically in the range of Shore A 70 to Shore A 90. In addition or alternatively, the tensile strength of the dynamic seal will preferably be 4 MPa or greater, preferably 8 MPa or greater, and typically about 8-13 MPa.

In still other embodiments, the dynamic seal 10 has a modulus at 100% of at least 2 MPa, preferably at least about 4 MPa, and typically in the range of about 4-8 MPa. In other embodiments, elongation at break of articles made from the processable compositions of the invention will be 10% or greater, preferably at least about 50%, more preferably at least about 150%, and typically in the range of 150-300%. Dynamic seal 10 of the invention may be characterized as having at least one of hardness, tensile strength, modulus, and elongation at break in the above noted ranges.

In various embodiments, the dynamic seal 10 is formed of a rubber composition comprising two-phases, where the matrix forms a continuous phase, and the vulcanized elastomeric material is in the form of particles forming a non-continuous, disperse, or discrete phase. In another aspect, the dynamic seal 10 is formed of elastomeric material and the matrix forms co-continuous phases. The composition of the elastomeric material contains 35% by weight or more, and preferably 40% by weight or more of the elastomer phase, based on the total weight of elastomer and thermoplastic material. Optionally, the composition contains 50% by weight or more of the elastomer phase. The elastomer phase may be present in the form of particles in a continuous thermoplastic phase, as a 3-D network forming a co-continuous phase with the thermoplastic material, or as a mixture of both.

The particles or 3-D network of the elastomer phase preferably have minimum dimensions of 10 µm or less, and more preferably 1 µm or less.

The dynamic seal 10 may be formed of a rubber composition which is made by dynamic vulcanization of a fluorocarbon elastomer in the presence of a thermoplastic component. In this regard, the method for producing a dynamic seal is provided. The formation of the seal begins with combining a curative agent, an elastomeric material, and a thermoplastic material to form a mixture. The mixture is heated at a temperature and for a time sufficient to effect vulcanization or cure of the fluorocarbon elastomer in the presence of the thermoplastic material. Mechanical energy is applied to the mixture of elastomeric material, curative agent and thermoplastic material during the heating step. The elastomer and thermoplastic components are heated in the presence of a curative agent during the mixing to effect cure of the elastomeric component. Alternatively, the elastomeric material and thermoplastic material may be mixed for a time and at a shear rate sufficient to form a dispersion of the elastomeric material in a continuous or co-continuous thermoplastic phase. Thereafter, a curative agent may be added to the dispersion of elastomeric material and thermoplastic material while continuing the mixing. Finally, the dispersion is heated while continuing to mix to produce the processable rubber composition of the invention.

The desired properties of polymeric materials for dynamic shaft seal are the ratio of recovery time to real time and the ratio of loss modulus to storage modulus, which is described as tangent delta. Ideally, the ratio of recovery time to real time should be less than 1 to function as dynamic shaft seal without leakage. The ratio of loss modulus to storage modulus changes with changes in temperature. Typically, cured elastomers show the less than 1 for dynamic seal; however, plastic polymeric materials exhibit equal to 1 or greater. PTFE is one of the plastic materials used for dynamic seal, and it functions as a dynamic seal even though the ratio is greater than 1. The long and curved lip design tend to compensate the lack of desired property to prevent "bellmouthing" behavior which leads to leakage.

At the same token, the ratio of loss modulus to storage modulus is desirable to be less than 0.1. The ratio is typically described as a tangent delta value with DMTA (Dynamic Mechanical Thermal Analyzer). Again, the elastomeric materials usually show less than 0.1 value; however, plastic materials exhibit equal or greater than 0.1 due to more viscosity contribution than elastomeric contribution of typical viscoelastic behavior of plastic materials. The typical value of PTFE plastic is greater than 0.1, especially at the phase transition temperatures (20°, 120°, etc.). However, the long and curved lip design tend to compensate to prevent "bellmouthing" behavior. TPU and TPE type thermoplastic materials according to the present invention can function as a dynamic seal by applying proper design to compensate for the lack of desired material properties, which could cause for leakage due to "bellmouthing" properties of plastic-like materials. The long and curved lip design, and associated reinforcement structure at the end of lip seal, and loading of a spring at the tip of the lip seal compensates for the lack of desirable material properties for dynamic seal applications. In this regard, it is preferable that the ratio of loss modulus to storage modulus of the material used in the seal is less than 1.0, and most preferably less than 0.1.

Figure 6A:
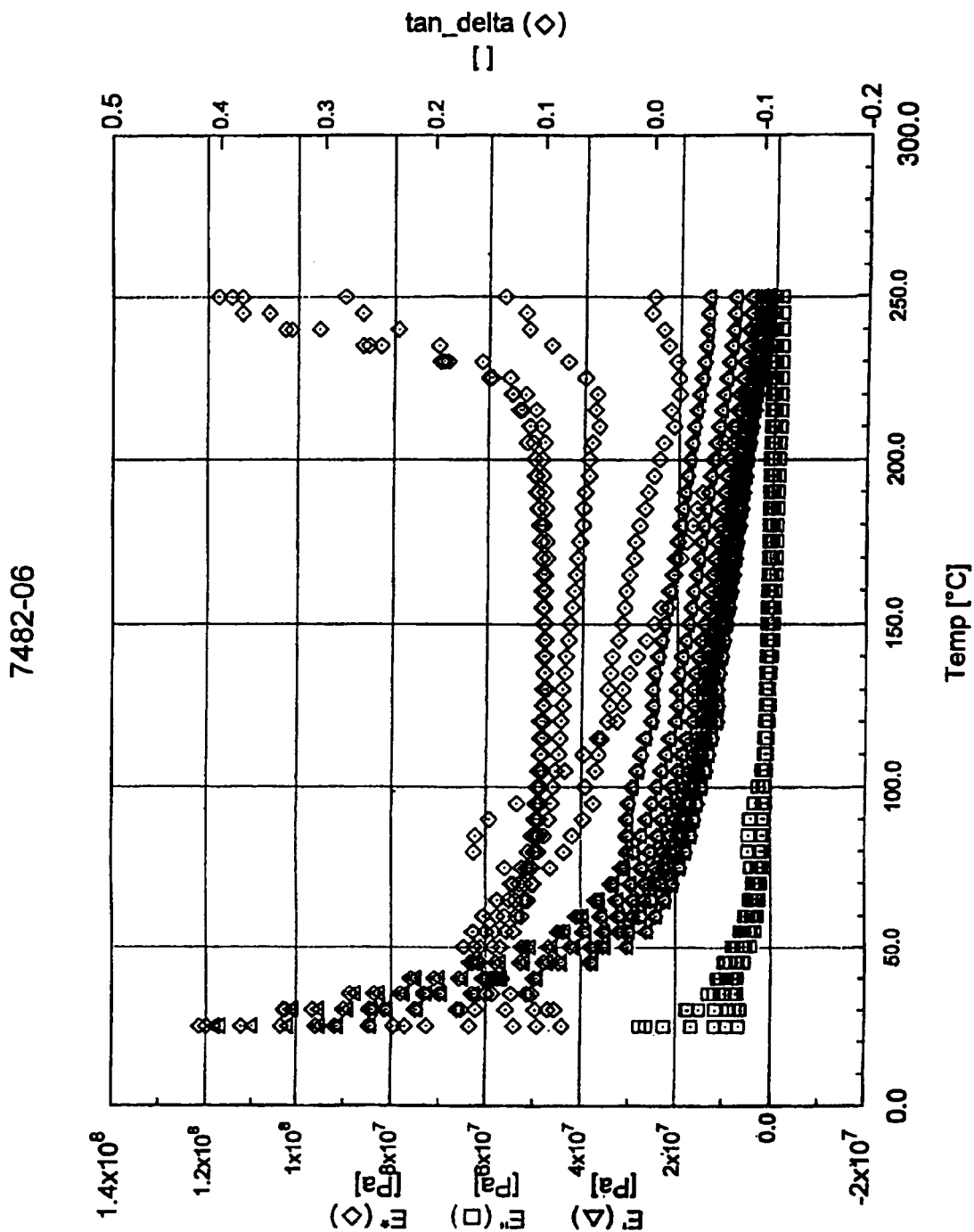
FIGS. 6a-6e are graphs describing material properties of various materials.
Figure 6B:
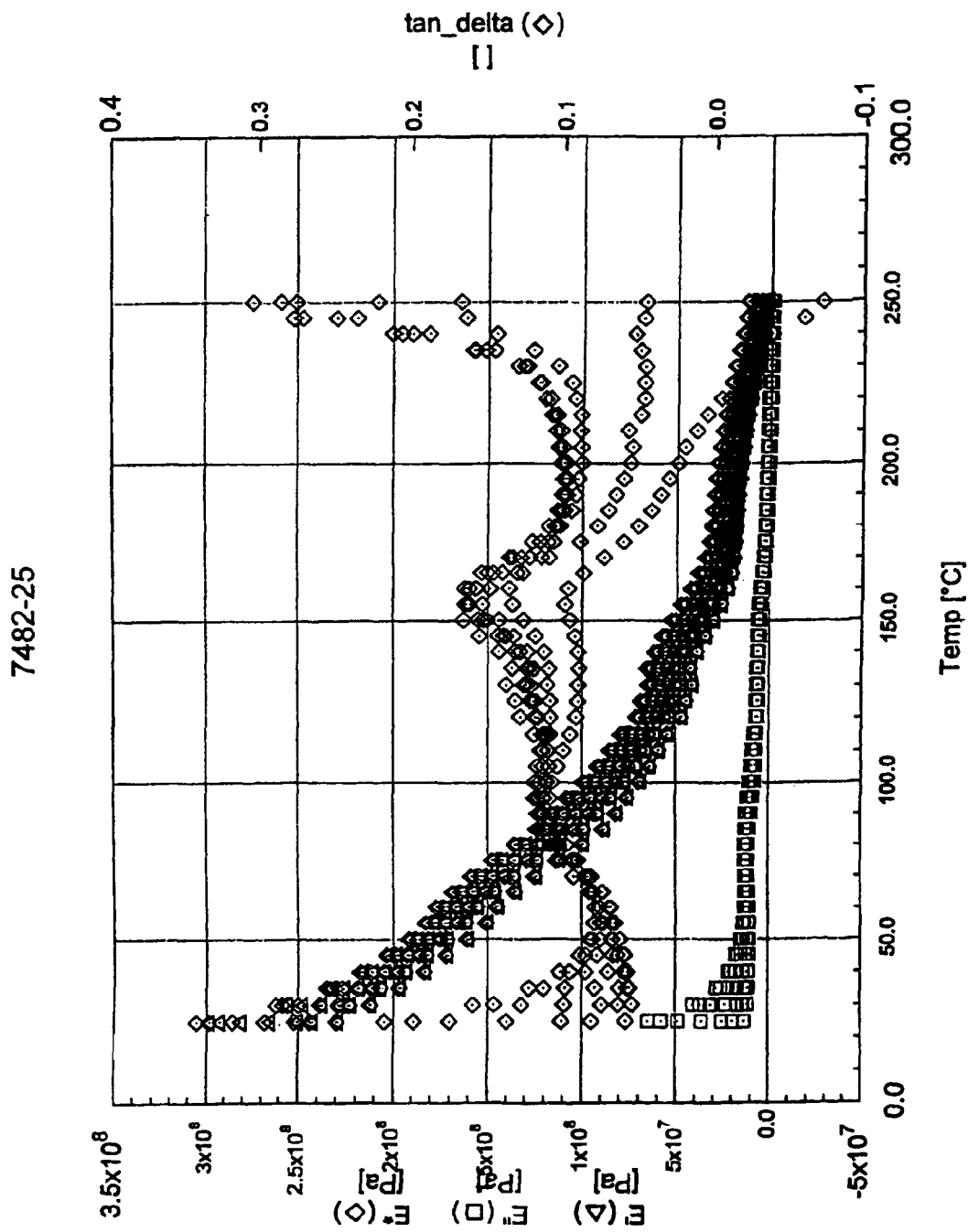
Figure 6C:
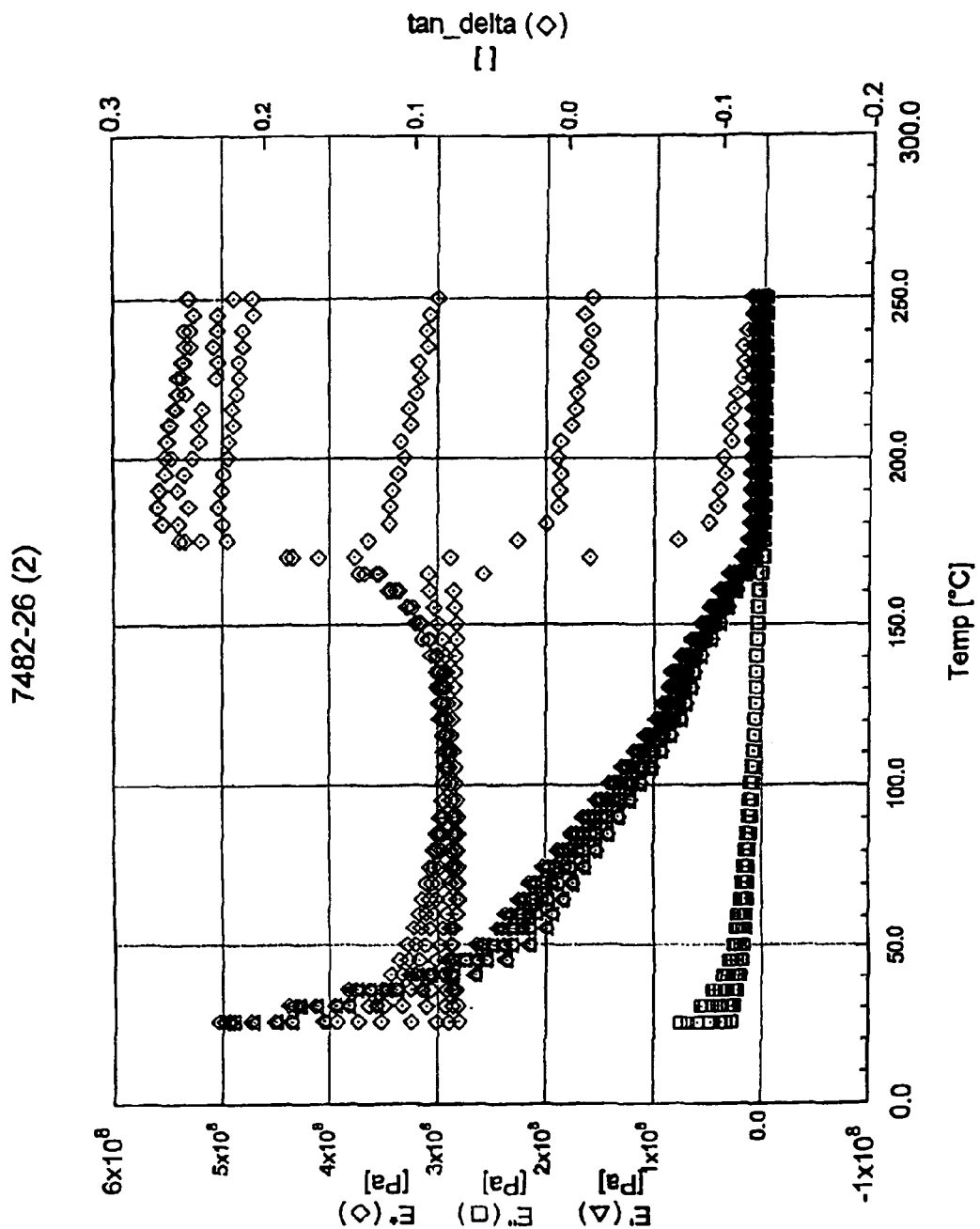
Figure 6D:
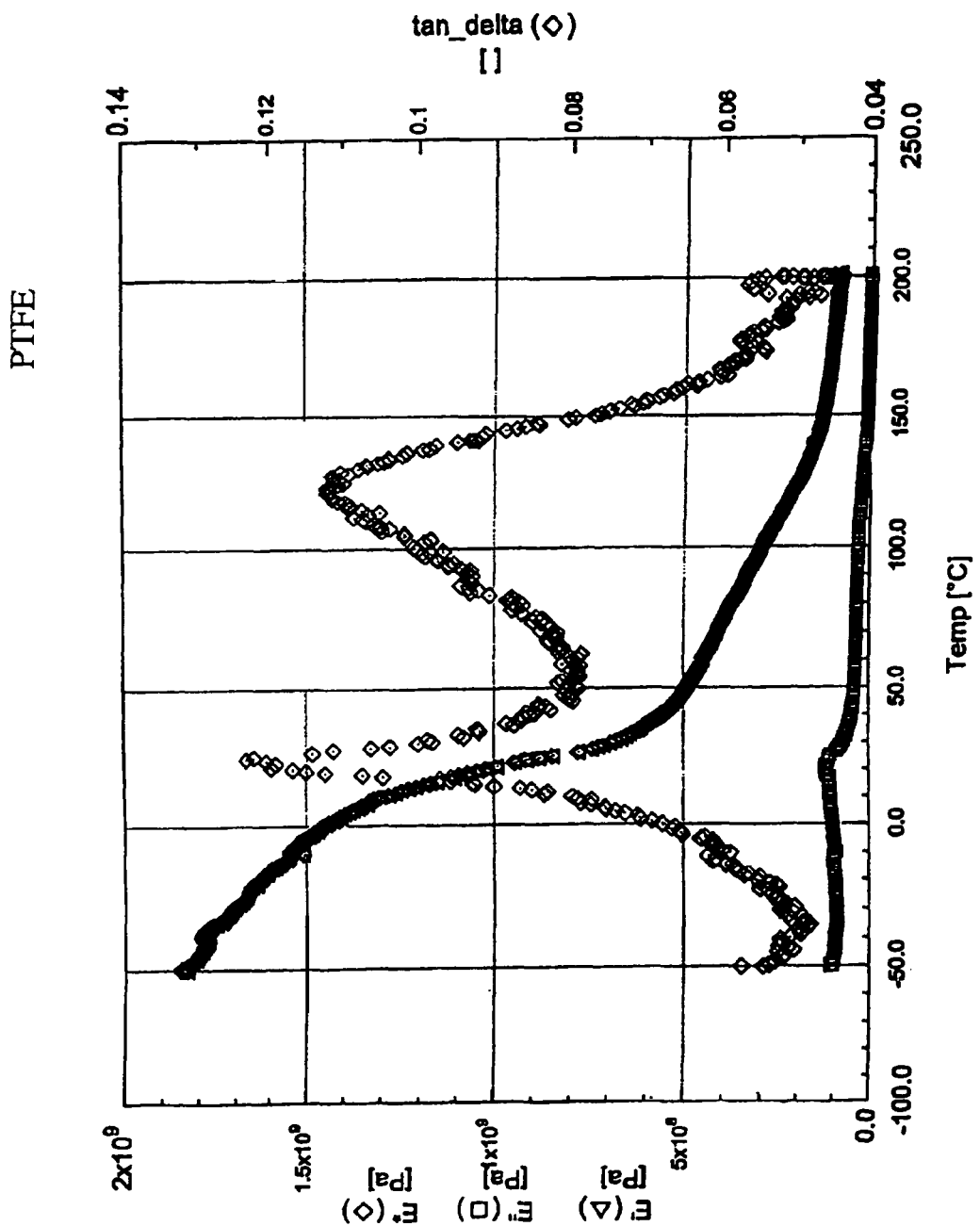
Figure 6E:
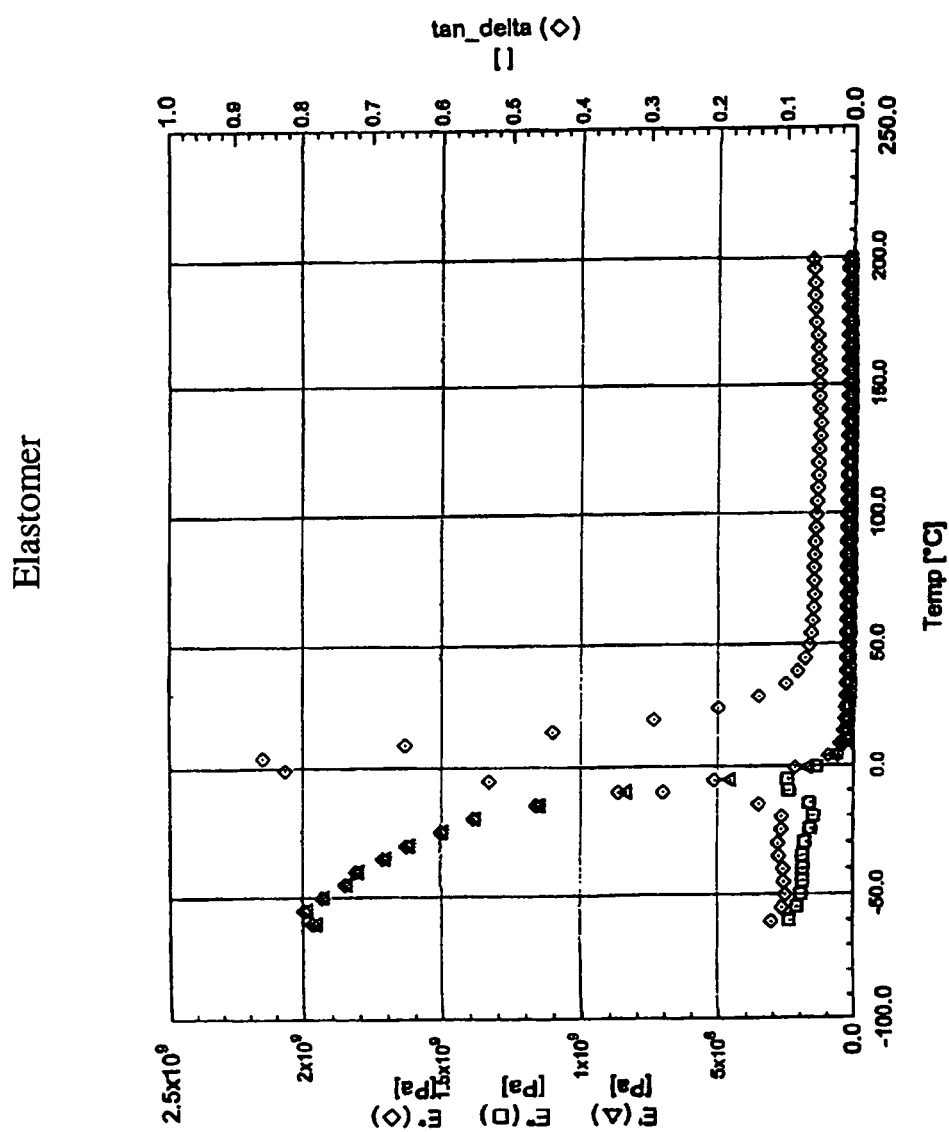

FIGS. 6a-6c represent material properties of the materials used to form the dynamic seal of the present invention. Specifically, shown is the value of tan-delta as a function of temperature. For comparison with thermoplastic and elastomeric material, FIGS. 6d and 6e are provided.

FIG. 6a represents testing of the material used to form the seal of the present invention. This material is formed of 70.0 pphn Dyneon FE5840; 30.0 pphn Dyneon BRE 7231X; 25.0 pphn Dyneon THV815X; 6.0 pphn Rhenofit CF; 3.0 pphn Elastomag 170; 1.0 pphn Kemamide 5221; and 10.0 pphn Austin Black.

The compositions of the invention are preferably processable by conventional plastic processing techniques. In another embodiment, a dynamic seal is provided comprising the cured, fluorocarbon elastomers dispersed in a thermoplastic matrix. Preferred fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a $C_{1-8}$ perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr). The copolymers may also contain relatively minor amounts of cure site monomers (CSM), discussed further below. Preferred copolymer fluorocarbon elastomers include VDF/HFP, VDF/HFP/CSM, VDF/HFP/TFE, VDF/HFP/TFE/CSM, VDF/PFVE/TFE/CSM, TFE/Pr, TFE/Pr/VDF, TFE/Et/PFVE/VDF/CSM, TFE/Et/PFVE/CSM and TFE/PFVE/CSM. The elastomer designation gives the monomers from which the elastomer gums are synthesized. The elastomer gums have viscosities that give a Mooney viscosity in the range generally of 15-160 (ML1+10, large rotor at 121° C.), which can be selected for a combination of flow and physical properties. Elastomer suppliers include Dyneon (3M), Asahi Glass Fluoropolymers, Solvay/Ausimont, Dupont, and Daikin.

In one embodiment, the elastomeric material is described as a copolymer of tetrafluoroethylene and at least one $C_{2-4}$ olefin. As such, the elastomeric material comprises repeating units derived from tetrafluoroethylene and at least one $C_{2-4}$ olefin. Optionally, the elastomeric material may contain repeating units derived from one or more additional fluorine-containing monomers.

In a preferred embodiment, the elastomeric material comprises repeating units derived from 10-90 mole % tetrafluoroethylene, 10-90 mole % $C_{2-4}$ olefin, and up to 30 mole % of one or more additional fluorine-containing monomers. Preferably, the repeating units are derived from 25-90 mole % tetrafluoroethylene and 10-75 mole % $C_{2-4}$ olefin. In another preferred embodiment, the repeating units are derived from 45-65 mole % tetrafluoroethylene and 20-55 mole % $C_{2-4}$ olefin.

In another embodiment, the elastomeric materials are curable fluorocarbon elastomers containing repeating units derived from fluoromonomers vinylidene fluoride (VDF) and hexafluoropropylene (HFP). In some embodiments, the elastomers further contain repeating units derived from tetrafluoroethylene. The elastomeric materials may be cured or crosslinked as described below to provide cured materials with rubber-like properties.

Chemically, in this embodiment the elastomeric material is made of copolymers of VDF and HFP, or of terpolymers of VDF, HFP, and tetrafluoroethylene (TFE), with optional cure site monomers. In preferred embodiments, they contain about 66 to about 70% by weight fluorine. The elastomers are commercially available, and are exemplified by the Viton® A, Viton® B, and Viton® F series of elastomers from DuPont Dow Elastomers. Grades are commercially available containing the gum polymers alone, or as curative-containing pre-compounds.

In another embodiment, the elastomers can be described chemically as copolymers of TFE and PFVE, optionally as a terpolymer with VDF. The elastomer may further contain repeating units derived from cure site monomers. The fluorocarbon elastomeric materials used to make the processable rubber compositions of the invention may typically be prepared by free radical emulsion polymerization of a monomer mixture containing the desired molar ratios of starting monomers. Initiators are typically organic or inorganic peroxide compounds, and the emulsifying agent is typically a fluorinated acid soap. The molecular weight of the polymer formed may be controlled by the relative amounts of initiators used compared to the monomer level and the choice of transfer agent if any. Typical transfer agents include carbon tetrachloride, methanol, and acetone. The emulsion polymerization may be conducted under batch or continuous conditions.

The thermoplastic material making up the matrix includes at least one component that is a thermoplastic polymer. This thermoplastic material can be a fluorine containing thermoplastic or a non-fluorine containing thermoplastic. The polymeric material softens and flows upon heating. In one aspect, a thermoplastic material is one the melt viscosity of which can be measured, such as by ASTM D-1238 or D-2116, at a temperature above its melting point.

The thermoplastic material of the invention may be selected to provide enhanced properties of the rubber/thermoplastic combination at elevated temperatures, preferably above 80° C. and more preferably at about 150° C. and higher. Such thermoplastics include those that maintain physical properties, such as at least one of tensile strength, modulus, and elongation at break to an acceptable degree at the elevated temperature. In a preferred embodiment, the thermoplastics possess physical properties at the elevated temperatures that are superior (i.e. higher tensile strength, higher modulus, and/or higher elongation at break) to those of the cured fluorocarbon elastomer (rubber) at a comparable temperature.

The thermoplastic polymeric material used in the invention may be a reactive oligomer type thermoplastic. Thermoplastic oligomer polymerized at the elevated temperature (150-250° C.) to form high molecular weight thermoplastics. Cyclic oligomer from Cyclics Corporation is one example. It becomes polybutyelene terephtalate (PBT) when polymerized, a thermoplastic polyester.

The thermoplastic polymeric material used in the invention may be a thermoplastic elastomer. Thermoplastic elastomers have some physical properties of rubber, such as softness, flexibility and resilience, but may be processed like thermoplastics. A transition from a melt to a solid rubber-like composition occurs fairly rapidly upon cooling. This is in contrast to conventional elastomers, which harden slowly upon heating. Thermoplastic elastomers may be processed on conventional plastic equipment such as injection molders and extruders. Scrap may generally be readily recycled.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Many thermoplastic elastomers are known. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-α-methylstyrene/polybutadiene/poly-α-methylstyrene, poly-α-methyl styrene/polyisoprene/poly-α-methylstyrene, and polyethylene/polyethylene-co-butylene/polyethylene.

Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

The thermoplastic polymeric material may also be selected from among solid, generally high molecular weight, plastic materials. Preferably, the materials are crystalline or semi-crystalline polymers, and more preferably have a crystallinity of at least 25 percent as measured by differential scanning calorimetry. Amorphous polymers with a suitably high glass transition temperature are also acceptable as the thermoplastic polymeric material. The thermoplastic also preferably has a melt temperature in the range from about 80° C. to about 350° C., or glass transition temperature in the range of −40° to about 300° C., but the melt temperature should generally be lower than the decomposition temperature of the thermoplastic vulcanizate.

Non-limiting examples of thermoplastic polymers include polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and fluorine-containing thermoplastics.

Polyolefins are formed by polymerizing α-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers, and blends of them, may be incorporated as the thermoplastic polymeric material of the invention.

Polyester thermoplastics contain repeating ester linking units in the polymer backbone. In one embodiment, they contain repeating units derived from low molecular weight diols and low molecular weight aromatic diacids. Non-limiting examples include the commercially available grades of polyethylene terephthalate and polybutylene terephthalate. Alternatively, the polyesters may be based on aliphatic diols and aliphatic diacids. Exemplary are the copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons have structures resulting from varying the size of the diamine and diacid components. Non-limiting examples include nylon 610, nylon 612, nylon 46, and nylon 6/66 copolymer. In another embodiment, the polyamides have a structure resulting from polymerizing a monomer with both amine and carboxyl functionality. Non-limiting examples include nylon 6 (polycaprolactam), nylon 11, and nylon 12.

Other polyamides made from diamine and diacid components include the high temperature aromatic polyamides containing repeating units derived from diamines and aromatic diacids such as terephthalic acid. Commercially available examples of these include PA6T (a copolymer of hexanediamine and terephthalic acid), and PA9T (a copolymer of nonanediamine and terephthalic acid), sold by Kuraray under the Genestar tradename. For some applications, the melting point of some aromatic polyamides may be higher than optimum for thermoplastic processing. In such cases, the melting point may be lowered by preparing appropriate copolymers. In a non-limiting example, in the case of PA6T, which has a melting temperature of about 370° C., it is possible to in effect lower the melting point to below a moldable temperature of 320° C. by including an effective amount of a non-aromatic diacid such as adipic acid when making the polymer.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is a copolymer of 1,4-benzenediamine and 1,2,4,5-benzenetetracarboxylic acid dianhydride.

In a preferred embodiment, the matrix comprises at least one non-fluorine containing thermoplastic, such as those described above. Thermoplastic fluorine-containing polymers may be selected from a wide range of polymers and commercial products. The polymers are melt processable—they soften and flow when heated, and can be readily processed in thermoplastic techniques such as injection molding, extrusion, compression molding, and blow molding. The materials are readily recyclable by melting and re-processing.

The thermoplastic polymers may be fully fluorinated or partially fluorinated. Fully fluorinated thermoplastic polymers include copolymers of tetrafluoroethylene and perfluoroalkyl vinyl ethers. The perfluoroalkyl group is preferably of 1 to 6 carbon atoms. Other examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoroolefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene.

Thermoplastic terpolymers may also be used. These include thermoplastic terpolymers of TFE, HFP, and vinylidene fluoride. These and other fluorine-containing thermoplastic materials are commercially available. Suppliers include Dyneon (3M), Daikin, Asahi Glass Fluoroplastics, Solvay/Ausimont and DuPont.

Useful curative agents include diamines, peroxides, and polyol/onium salt combinations. Diamine curatives have been known since the 1950's. Diamine curatives are relatively slow curing, but offer advantages in several areas. Such curatives are commercially available, for example as Diak-1 from DuPont Dow Elastomers.

Heating and mixing or mastication at vulcanization temperatures are generally adequate to complete the vulcanization reaction in a few minutes or less, but if shorter vulcanization times are desired, higher temperatures and/or higher shear may be used. A suitable range of vulcanization temperature is from about the melting temperature of the thermoplastic material (typically 120° C.) to about 300° C. or more. Typically, the range is from about 150° C. to about 250° C. A preferred range of vulcanization temperatures is from about 180° C. to about 220° C. It is preferred that mixing continue without interruption until vulcanization occurs or is complete.

If appreciable curing is allowed after mixing has stopped, an unprocessable thermoplastic vulcanizate may be obtained. In this case, a kind of post curing step may be carried out to complete the curing process. In some embodiments, the post curing takes the form of continuing to mix the elastomer and thermoplastic during a cool-down period.

After dynamic vulcanization, a homogeneous mixture is obtained, wherein the rubber is in the form of small dispersed particles essentially of an average particle size smaller than about 50 μm, preferably of an average particle size smaller than about 25 μm. More typically and preferably, the particles have an average size of about 10 μm or less, preferably about 5 μm or less, and more preferably about 1 μm or less. In other embodiments, even when the average particle size is larger, there will be a significant number of cured elastomer particles less than 1 μm in size dispersed in the thermoplastic matrix.

The size of the particles referred to above may be equated to the diameter of spherical particles, or to the diameter of a sphere of equivalent volume. It is to be understood that not all particles will be spherical. Some particles will be fairly isotropic so that a size approximating a sphere diameter may be readily determined. Other particles may be anisotropic in that one or two dimensions may be longer than another dimension. In such cases, the preferred particle sizes referred to above correspond to the shortest of the dimensions of the particles.

In some embodiments, the cured elastomeric material is in the form of particles forming a dispersed, discrete, or non-continuous phase wherein the particles are separated from one another by the continuous phase made up of the thermoplastic matrix. Such structures are expected to be more favored at relatively lower loadings of cured elastomer, i.e. where the thermoplastic material takes up a relatively higher volume of the compositions. In other embodiments, the cured material may be in the form of a co-continuous phase with the thermoplastic material. Such structures are believed to be favored at relatively higher volume of the cured elastomer. At intermediate elastomer loadings, the structure of the two-phase compositions may take on an intermediate state in that some of the cured elastomer may be in the form of discrete particles and some may be in the form of a co-continuous phase with the thermoplastic material.

What is claimed is:

1. A dynamic seal assembly for installation between first and second relatively rotating members, said assembly comprising: a ring for fixed engagement with said first member and an annular seal extending radially from said ring and configured to slidably engage said second member, wherein said radial seal has a thickness, and a length that is from about 1 to about 15 times greater than said thickness, and comprises a fluorocarbon elastomer dispersed in a matrix comprising a non-fluorine containing thermoplastic material.

2. A dynamic seal according to claim 1, wherein said cured fluorocarbon elastomer is present as a discrete phase or a phase co-continuous with said matrix, and wherein said radial seal has a tan-delta of less than 1.0.

3. A dynamic seal according to claim 1, wherein the radial seal is made by a process comprising the step of dynamically vulcanizing a fluorocarbon elastomer in the presence of a thermoplastic material.

4. A dynamic seal according to claim 1, wherein said radial seal is made by a process comprising the steps of:
(a) combining an uncured or partially cured fluorocarbon elastomer, a curative agent capable of reacting with the fluorocarbon elastomer to effect cure, and a thermoplastic material;
(b) mixing the combination;
(c) applying heat to the combination during the mixing step; and
(d) forming the seal by subjecting the composition to one of blow molding, compressive molding, injection molding, or extrusion.

5. A dynamic seal according to claim 1 wherein the radial seal is made by a process comprising the steps of:
(a) mixing the elastomer and thermoplastic components in the presence of the curative agent;
(b) heating during mixing to effect cure of the elastomeric components; and
(c) injection molding the composition.

6. A dynamic seal assembly for installation between an inner rotating shaft and an outer housing comprising:
an annular radial seal extending from said non-rotating housing into sliding contact with said shaft, said annular radial seal being configured to slidably engage said shaft, said radial seal having a thickness, and a length which is from about 1 to about 15 times greater than said thickness, said annular radial seal further comprising a flat bearing surface which contacts the rotating shaft, and said annular seal being formed of a vulcanized fluorocarbon elastomer dispersed in a thermoplastic matrix comprising a non-fluorine-containing polymeric material, said annular seal having a tangent delta of less than about 1.0.

* * * * *